United States Patent
Malygin et al.

(10) Patent No.: US 10,191,939 B2
(45) Date of Patent: Jan. 29, 2019

(54) SYSTEMS AND METHODS FOR SOCIAL APPEND

(71) Applicant: salesforce.com, inc., San Francisco, CA (US)

(72) Inventors: Sergei Malygin, San Carlos, CA (US); Venkata Muralidhar Tejomurtula, Danville, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 200 days.

(21) Appl. No.: 14/466,034

(22) Filed: Aug. 22, 2014

(65) Prior Publication Data
US 2015/0058422 A1 Feb. 26, 2015

Related U.S. Application Data

(60) Provisional application No. 61/869,309, filed on Aug. 23, 2013.

(51) Int. Cl.
*G06F 17/30* (2006.01)
*H04L 29/08* (2006.01)
*G06Q 50/00* (2012.01)

(52) U.S. Cl.
CPC .. *G06F 17/30424* (2013.01); *G06F 17/30864* (2013.01); *H04L 67/1025* (2013.01);
(Continued)

(58) Field of Classification Search
CPC .... G06Q 10/1053; G06Q 50/01; G06Q 10/10; G06Q 10/107; G06Q 10/101;
(Continued)

(56) References Cited

U.S. PATENT DOCUMENTS 5,577,188 A 11/1996 Zhu
5,608,872 A 3/1997 Schwartz
(Continued)

FOREIGN PATENT DOCUMENTS

CN 102143485 A * 8/2011

OTHER PUBLICATIONS

Oracle "Class Normalizer" Feb. 1, 2001 Oracle All pages https://docs.oracle.com/javase/7/docs/api/java/text/Normalizer.html.*
(Continued)

*Primary Examiner* — Chris Parry
*Assistant Examiner* — Abderrahmen Chouat
(74) *Attorney, Agent, or Firm* — Dergosits & Noah LLP; Todd A. Noah

(57) ABSTRACT

Some embodiments of the present invention include a method for providing social information of members of one or more social networks includes receiving a request for a social handle of a person via a social handle application programming interface (API), the request including contact information about the person, performing a search for the social handle of the person using the contact information, normalizing the social handle if it is not already normalized to generate a normalized social handle, storing the normalized social handle as being associated with the contact information, and providing the normalized social handle in a response to the request.

17 Claims, 11 Drawing Sheets

(52) U.S. Cl.
CPC .... *G06F 17/3053* (2013.01); *G06F 17/30908* (2013.01); *G06Q 50/01* (2013.01)

(58) Field of Classification Search
CPC .............. G06Q 30/0255; G06Q 30/02; G06Q 30/0282; H04L 12/588; H04L 12/5895; H04L 51/32; H04L 61/3015; H04L 63/102; H04L 67/02; H04L 67/22; H04L 67/306; H04L 67/2842; H04L 61/1511; H04L 41/12; H04L 43/10; H04L 41/509; H04L 43/08; H04L 47/70; H04L 41/0813; H04L 41/0869; H04L 41/50; H04L 61/6009; H04L 41/0893; H04L 41/0816; H04L 41/5041; H04L 61/1535; H04L 65/403; H04L 65/60; H04L 67/2885; H04L 67/2852; H04L 69/22; H04L 67/2819; H04L 67/28; H04L 67/289; H04L 5/0007; H04L 43/16; H04L 67/1095; H04L 29/06; H04L 67/2804; H04L 63/1441; H04L 27/2602; H04L 67/10; H04L 27/26; H04L 27/2605; H04L 27/2607; H04L 43/065; H04L 67/1008; H04L 67/1023; H04L 67/2814; H04L 27/2627; H04L 27/263; H04L 27/2646; H04L 29/12066; H04L 5/0044; H04L 5/005; H04L 67/1002; H04L 67/1025; H04L 67/1097; H04L 2029/06054; H04L 67/04; H04L 67/1006; H04L 67/101; H04L 67/1012; H04L 67/1019; H04L 67/2895; G06F 17/30675; G06F 17/30864; G06F 21/316; G06F 3/04842; G06F 17/3028; G06F 17/30893; G06F 17/00; G06F 17/30867; G06F 9/5083; G06F 12/0808; G06F 9/5055; G06F 17/3053; G06F 17/30902; G06F 17/3089; G06F 17/30011; G06F 17/30899; G06F 2209/509; G06F 17/30887; G06F 9/505; G06F 17/30958; G06F 17/3071; G06F 17/2785; G06F 17/30241; G06F 17/30528; G06F 17/30554; G06F 17/30705
USPC ... 705/321, 14.43, 319, 14.45, 14.53, 14.58, 705/14.67, 14.72, 3, 320, 4, 5; 709/204, 709/206; 707/E17.108, 706, 709, 707/999.002, E17.005, E17.01, 736, 769, 707/770, 783, 802, 999.01

See application file for complete search history.

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,702,685 B2 * | 4/2010 | Shrufi | G06Q 10/10 707/760 |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,402,023 B2 * | 3/2013 | Sheehan | G06F 17/30528 707/728 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |

(56) References Cited

U.S. PATENT DOCUMENTS

| | | |
|---|---|---|
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0104042 A1* | 5/2008 | Gutt .................. G06F 17/30867 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2009/0204408 A1* | 8/2009 | Simpson .............. G06Q 10/087 704/273 |
| 2011/0288911 A1* | 11/2011 | Barnes, Jr. .......... G06F 3/04847 705/14.1 |
| 2012/0185472 A1* | 7/2012 | Ahmed ............. G06F 17/30867 707/728 |
| 2012/0233137 A1 | 9/2012 | Jakobson et al. |
| 2013/0129075 A1* | 5/2013 | Whitaker .............. H04M 3/523 379/265.09 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238600 A1* | 9/2013 | Kindler ............. G06F 17/30958 707/722 |
| 2013/0290208 A1* | 10/2013 | Bonmassar ............ G06Q 50/01 705/321 |
| 2014/0146956 A1* | 5/2014 | Dave ................ H04M 3/42042 379/142.01 |
| 2014/0214931 A1* | 7/2014 | Sidhu ................... H04L 65/403 709/204 |
| 2015/0237087 A1* | 8/2015 | Rekhi ................... H04L 65/403 709/204 |

OTHER PUBLICATIONS

Ed Simon "Canonicalizer" Sep. 22, 1999 W3.org http://www.w3.org/Signature/Code/Canonicalizer.java.*
Christensson, P. (Apr. 8, 2015). Handle Definition. Retrieved Aug. 10, 2017, from https://techterms.com/definition/handle.*
https://en.wikipedia.org/wiki/URL_normalization, URL Normalization, Sep. 23, 2012, Wikipedia, pp. 1-4.*
https://en.wikipedia.org/wiki/URL_normalization, URL Normalization, Sep. 23, 2012, Wikipedia pp. 1-4 (Year: 2012).*
U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner ns to Provisional U.S. Patent
SYSTEMS AND METHODS FOR SOCIAL APPEND

CLAIM OF PRIORITY

This application claims priority to Provisional U.S. Patent Application No. 61/869,309, filed on Aug. 23, 2013, entitled "SOCIAL APPEND" by Malygin et al., which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to providing social information.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Social network providers such as Facebook, Twitter, LinkedIn, and Google+ have enabled their users to share a multitude of social information with other users. The social information may provide valuable insight into the interests of the users including, for example, business sentiment for various consumer brands. There is a need for an easy and consistent approach to provide the social information on-demand.

BRIEF SUMMARY

For some embodiments, methods and systems for providing social information of members of one or more social networks includes receiving a request for a social handle of a person via a social handle application programming interface (API), the request including contact information about the person, performing a search for the social handle of the person using the contact information, normalizing the social handle if it is not already normalized to generate a normalized social handle, storing the normalized social handle as being associated with the contact information, and providing the normalized social handle as a response to the request.

For some embodiments, methods and systems for providing social information of members of one or more social networks includes receiving a request for a social handle of a person via a social handle application programming interface (API), the request including contact information about the person, matching the contact information received via the request with stored contact information to find a stored normalized social handle, and providing the stored normalized social handle as a response to the request.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
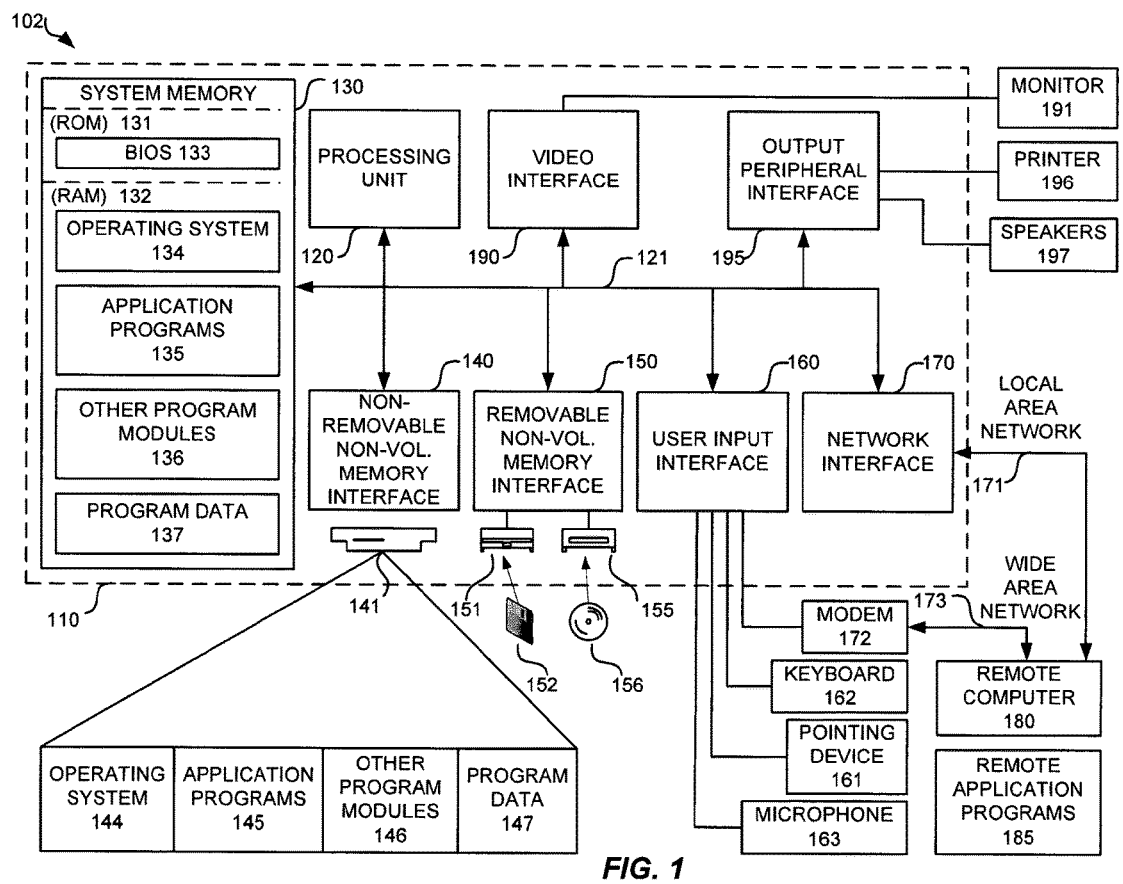
FIG. 1 shows a diagram of an example computer system 102 that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

A social handle may be a link associated with a social network provider (e.g., LinkedIn, Facebook, Twitter, etc.). A social handle may be associated with social information of a person who is a member of a social network provider. When a social handle is selected, the social information of the person may be accessible. It may be possible that a person has multiple social handles with the same social network provider. It may be possible that a person has a social handle with one social network provider and another social handle with another social network provider. Although the term "person" is used to associate with a social handle, it is possible that the "person" may be an entity.

The disclosed embodiments may include methods of providing social information and may include receiving a request for a social handle of a person via a social handle application programming interface (API), the request including contact information about the person, performing a search for the social handle of the person using the contact information, normalizing the social handle if it is not already normalized to generate a normalized social handle, storing the normalized social handle as being associated with the contact information, and providing the normalized social handle as a response to the request.

The disclosed embodiments may include systems to providing social information of members of social networks. The systems may include a processor and one or more stored sequences of instructions which, when executed by the processor, cause the processor to receive, via a social handle application programming interface (API), a request for a social handle of a person, perform a search for the social handle of the person using contact information provided with the request, normalize the social handle if it is not already normalized to generate a normalized social handle, store the normalized social handle as being associated with the contact information, and provide the normalized social handle as a response to the request.

The disclosed embodiments may include a machine-readable medium carrying one or more sequences of instructions for providing social information, which instructions, when executed by one or more processors, cause the one or more processors to receive, via a social handle application programming interface (API), a request for a social handle of a person, perform a search for the social handle of the person using contact information provided with the request, normalize the social handle if it is not already normalized to generate a normalized social handle, store the normalized social handle as being associated with the contact information, and provide the normalized social handle as a response to the request.

The disclosed embodiments may be related to providing social handles for use in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computer system that may be used with some embodiments of the present invention. The computing system 102 may be used to access information from a database (e.g., social handle database) that may store contact information and corresponding normalized social handles.

The computer system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computer system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a Netbook, a tablet computer, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
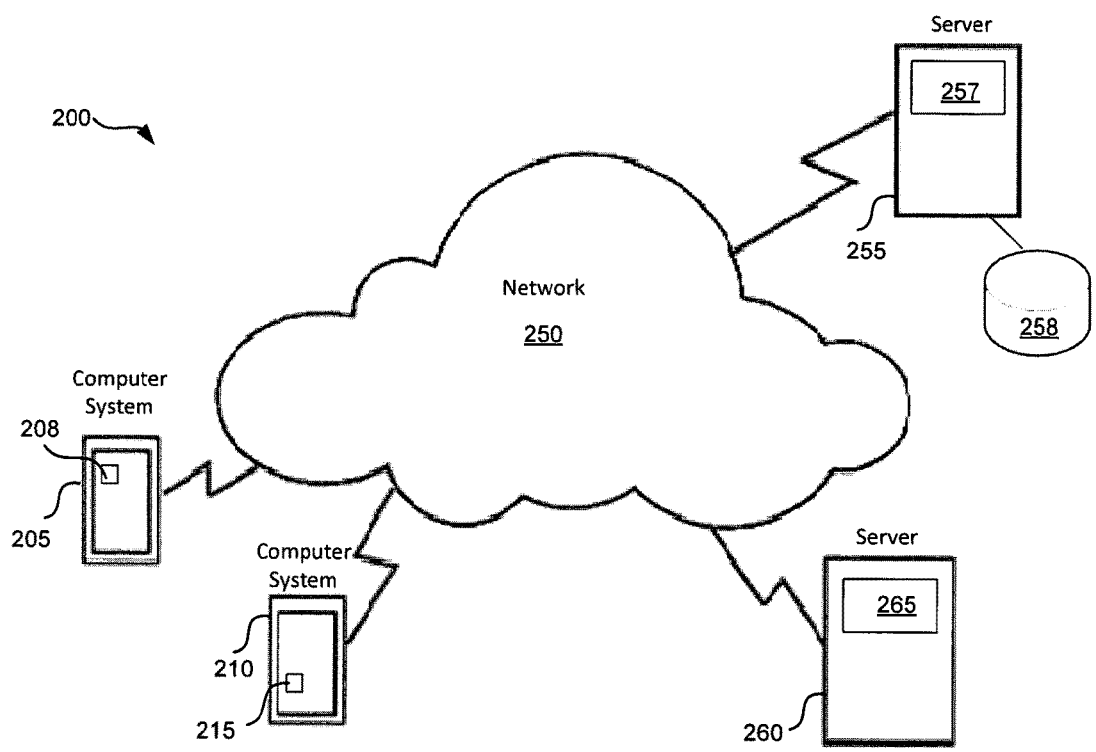
FIG. 2 shows a diagram of an example network environment 200 that may be used with some embodiments of the present invention.

FIG. 2 shows a diagram of an example network environment that may be used with some embodiments of the present invention. Network environment 200 includes computing systems 205 and 210. One or more of the computing systems 205 and 210 may be a mobile computing system. The computing systems 205 and 210 may be connected to the network 250 via a cellular connection or via a Wi-Fi router (not shown). The network 250 may be the Internet. The computing systems 205 and 210 may be coupled with one or more server computing systems 255 and 260 via the network 250. A requester may use the computing system 205 and local application 208 (e.g., browser) to connect to the server computing system 255 and log into the application 257 (e.g., a Salesforce.com® application) to request for a social handle. The requester may be a user or an application using a social handle API. For example, the application 215 in the computing system 210 may populate the social handle API with the contact information of a person and send the contact information to the server computing system 255. The contact information may include a first name and a last name of a person whose social handle is being requested. The server computing system 255 may be coupled to a database 258 which may be configured to store normalized social handles. The database 258 may be referred to herein as a social handle database.

The server computing system 255 may be coupled with the server computing system 260. When the social handle database does not have a copy of the requested social handle, the server computing system 250 may request the server computing system 260 to search for the requested social handle in the network 250. The searching operations may be performed by application 265 in the server computing system 260. The application 265 may also be configured to perform normalization of the social handles found in the network 250. The normalized social handles generated by the application 265 may be stored in the social handle database 258.

Figure 3:
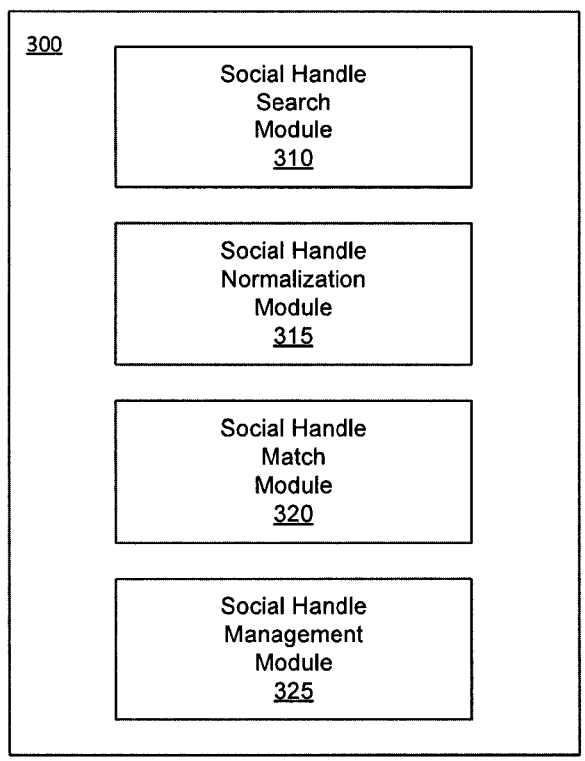
FIG. 3 shows an example of application modules that may be included in a system that provides social handles, in accordance with some embodiments.

FIG. 3 shows an example of application modules that may be included in a system that provides social handles, in accordance with some embodiments. System 300 includes a social handle search module 310, a social handle normalization module 315, a social handle match module 320, and a social handle management module 325. The social handle search module 310 may be configured to search the network 250 to find social handles that correspond to the contact information received with the request and via the social handle API. One or more of the application modules 310-325 may be implemented in one server computing system or in different server computing systems. Although not shown, the system 300 may be associated with the social handle database 258 to store normalized social handles and corresponding contact information.

The social handle search module 310 may be configured to search for the social handles of a person based on the contact information received via the social handle API. Following is example schema for the social handle API to transmit the contact information:

```
<contact>
    <companyName>Cisco Systems</companyName>
    <email>lionel.lobo@cisco.com</email>
    <firstName>Lion</firstName>
    <lastName>Lobo</lastName>
    ......
</contact>
```

The social handle search module 310 may search for publicly available social handles. The search may be performed when the social handle database 258 does not have a copy of the requested social handle. Following is a Uniform Resource Locator (URL) example of a publicly available social handle (referred to as a social handle URL) associated with the social network Facebook:

EXAMPLE 1 http://facebook.com/profile.php?id=100002453742790#/pages/arrowhead-general-insurance-agency-inc/206925925993353

Following is a social handle URL example associated with the social network LinkedIn:

EXAMPLE 2 http://linkedin.com/company/simons-bitzer-&-associates?trk?ppro_cprof

As can be noted, both of the social handle URL examples shown above include many special characters. They use different formats and it's not easily decipherable which portion of the social handle URL is more relevant.

The social handle normalization module 315 may be configured to normalize the social handle URLs found by the social handle search module 310. For some embodiments, the normalization operations may generate a unique "canonical", "normal" or "standard" representation of the social handle URL representing a person or an entity. The normalization operations may remove characters from a social handle URL. A normalized social handle is a valid URL that represents the same social information as the corresponding social handle URL. For some embodiments, in addition to the domain name, a normalized social handle includes at least a portion of the social handle URL. Following is an example normalized social handle that corresponds to the social handle URL shown in Example 1 above.

EXAMPLE 3 http://facebook.com/206925925993353
Following is an example normalized social handle that corresponds to the social handle URL shown in Example 2 above.

EXAMPLE 4 http://linkedin.com/company/simons-bitzer-&-associates
As can be noted, each of the normalized social handles shown in Example 3 and Example 4 is simpler than their corresponding social handle URL shown in Example 1 and Example 2. A normalized social handle generated by the social handle normalization module 315 is unique to a person or an entity. The uniqueness of the normalized social handle may help prevent duplicates.

The social handle match module 320 may be configured to match the contact information received via the social handle API with information stored in the social handle database 258. When a match exists, the social handle match module 320 may retrieve a copy of the requested social handle from the social handle database 258 and transmit the social handle to the requester. A matching API may be used to transmit the requested social handle to the requester. The matching API may be configured to enable the social handle match module 320 to transmit one or more normalized social handles in a response to the requester. The response may be in a particular format such as an eXtensible Markup Language (XML) or JavaScript Object Notation (JSON) format.

```
    <handle>
        <url>www.facebook.com/abc</url>
        <id>abc</id>
    <handle>
    </handles>
    <handles provider="TWITTER">
        <handle>
            <url>www.twitter.com/pnachnani</url>
            <id>pnachnani</id>
        <handle>
        <handle>
            <url>www.twitter.com/abc</url>
            <id>abc</id>
        <handle>
    </handles>
    </socialHandles>
</contact>
</matchedItems>
```

For some embodiments, the normalized social handles associated with the same social network provider may be grouped together when they are sent to the requester. For example, the normalized social handles associated with Facebook may be grouped separately from the normalized social handles associated with LinkedIn. Other information that may be sent include the social handle ID, the domain name of the social network provider, and any applicable comment related to normalized social handles. For some embodiments, there is no filtering of the social handles and all located social handles are sent to the requester regardless of the social network provider. The requester may need to determine which social handle to use and which to ignore in order to access the relevant social information. Following is a table that shows example information that may be sent to the requester using the matching API.

TABLE 1

| Domain | Normalized Social Handle | Handle ID | Comment |
|---|---|---|---|
| Facebook | http://facebook.com/206925925993353 | 206925925993353 | |
| Facebook | http://facebook.com/siddo4ty4 | siddo4ty4 | |
| LinkedIn | http://linkedin.com/in/domenicfenoglio | in/domenicfenoglio | |
| LinkedIn | http://www.linkedin.com/pub/venkat-maddela/4b/b07/773 | pub/venkat-maddela/4b/b07/773 | |
| LinkedIn | http://linkedin.com/in/domenicfenoglio/fr | in/domenicfenoglio/fr | Language specific page |
| Twitter | http://twitter.com/pitneybowes | pitneybowes | |
| Google+ | https://plus.google.com/116334694788096438740 | 116334694788096438740 | |

Following is example schema for the matching API to transmit the social handles to the requester:

```
<match>
<matchedItems>
<contact>
    <firstName diff="true">Lionel</firstName>
    <lastName diff="false">Lobo</lastName>
    <title diff="true">Engineering Manager</title>
    <email diff phone diff="false">+1.408.526.4000</phone>
    <contactId diff="true">1345</contactId>
    ......
    ="false">lionel.lobo@cisco.com</email>
<
<socialHandles>
    <handles provider="FACEBOOK">
        <handle>
            <url>www.facebook.com/123</url>
            <id>123</id>
        <handle>
```

For some embodiments, a contributing API may be provided to enable an application (e.g., administrator user interface shown in FIG. 6) to contribute a social handle corresponding to a contact information. The social handle contributed with the contributing API may not be a normalized social handle and may need to be normalized by the social handle normalization module 315 before being stored in the social handle database 258.

The social handle management module 325 may be configured to manage the social handles stored in the social handle database 258. The social handle management module 325 may be associated with an administrator user interface to enable an administrator to perform the management operations. The social handle management module 325 may perform operations to accommodate privacy policies, keep the social handles updated, remove dead links, etc.

Figure 4:
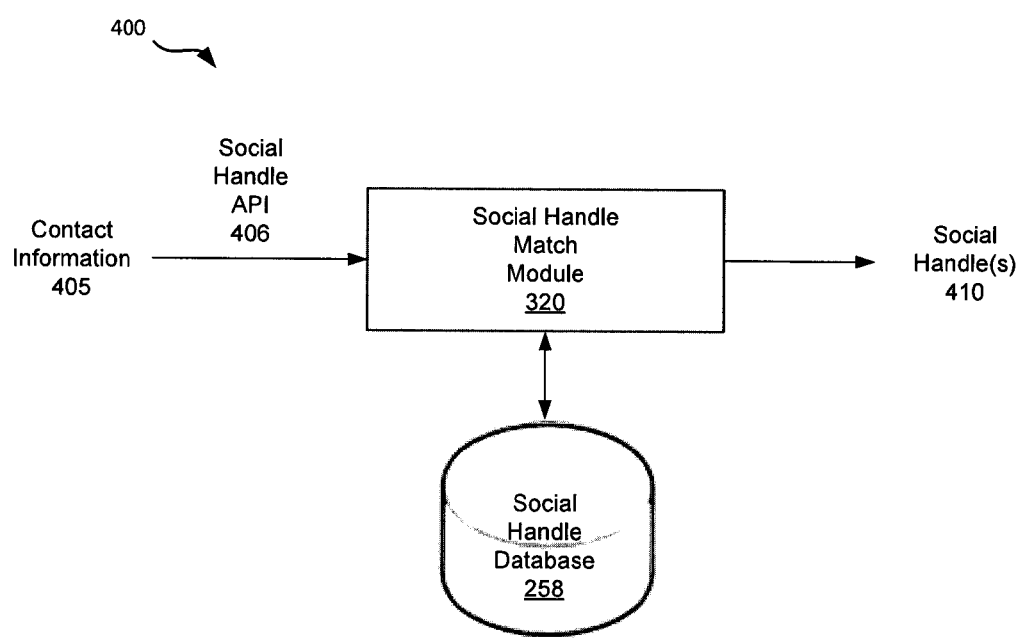
FIG. 4 shows block diagram of a social handle match module, performed in accordance with some embodiments.

FIG. 4 shows block diagram of a social handle match module, performed in accordance with some embodiments.

The social handle match module 320 may be coupled to the social handle database 258. When a request for a social handle is received from a requester, the social handle match module 320 may retrieve the contact information 405 from the social handle API 406. The social handle match module 320 may compare the contact information 405 with contact information stored in the social handle database 258. When there is a match, the social handle 410 corresponding to the contact information 405 may be retrieved from the social handle database 258. It may be possible that the social handle match module 258 finds multiple matching social handles. This may be because a single contact information may be associated with multiple social handles from the same social network provider or from different social network providers.

For some embodiments, when there are multiple matching social handle, each social handle may be assigned a confidence level. A confidence level may reflect whether the social handle found by the social handle match module 320 is more likely or less likely what the requester is expecting. The confidence level may be dependent on the quality of the contact information. For example, if the contact information provided with the social handle API is extensive and the social handle match module 320 is able to find a social handle that represents a complete match, then the confidence level assigned to that social handle may be high. If only a portion of the contact information is matched, then the confidence level of the resulting social handle may not be high. For some embodiments, the social handle match module 320 may be configured to transmit the social handles to the requester in an order based on the confidence level. Referring to Table 1, the normalized social handle "http://facebook.com/206925925993353" may be associated with a higher confidence level than the normalized social handle "http://facebook.com/siddo4ty4".

Figure 5:
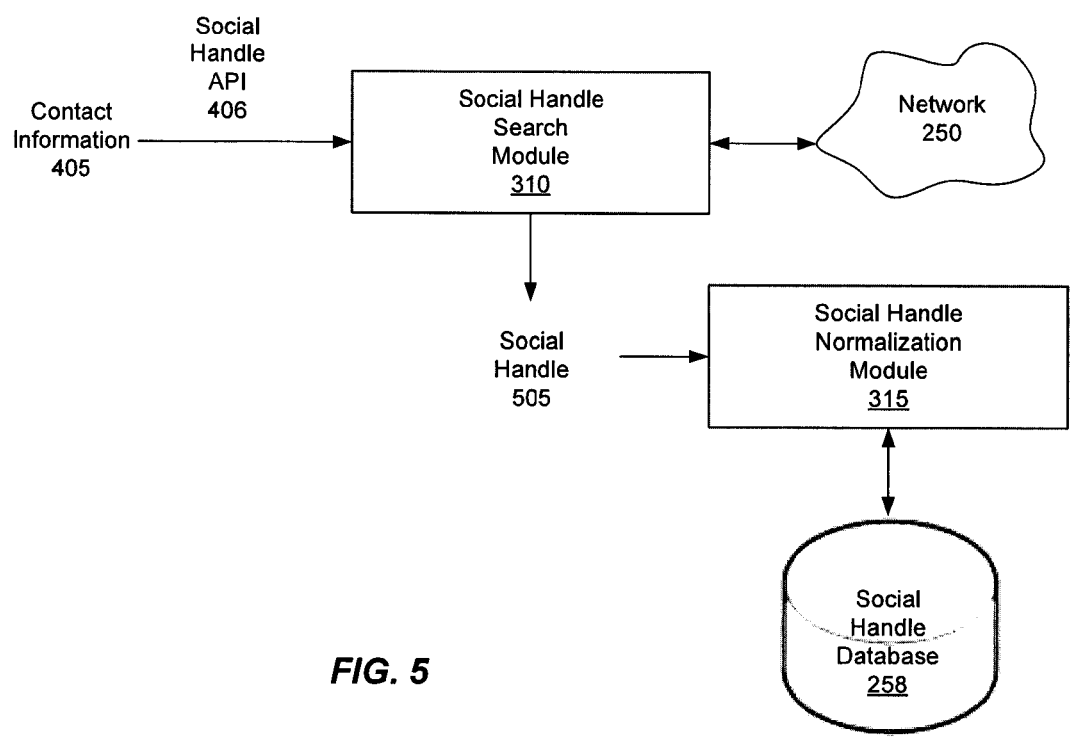
FIG. 5 shows block diagram of a social handle search module and normalization module, performed in accordance with some embodiments.

FIG. 5 shows block diagram of a social handle search module and normalization module, performed in accordance with some embodiments. The social handle search module 310 may be coupled to the network 250. When a request for a social handle is received from a requester, and the social handle match module 320 is not able to find a match in the social handle database 258, the social handle search module 310 may need to search the network 250 for a publicly available social handle based on the contact information 405. The contact information 405 is included in the social handle API 406. The social handle search module 310 may be able to locate one or more social handles 505. The social handle URL 505 may be in a format provided by the associated social network providers. Examples of the social handle URL 505 are shown in Example 1 and Example 2 above.

The social handle normalization module 315 may be configured to receive the social handles 505 and normalized them to generate the normalized social handles. Examples of the normalized social handles are shown in Example 3 and Example 4 above. The normalized social handle may be stored in the social handle database 258. For some embodiment, the normalization operations performed by the social handle normalization module 315 may identify a social handle identification (ID) that is embedded in the social handle URL.

The normalization operations are performed based on two set of normalization rules. The normalization rules in the first set can be applied to all social handle URLs regardless of the associated social network provider. The normalization rules in the second set are grouped into subsets, with the normalization rules in each subset to be applied to the social handle URL of a different social network provider. The normalization rules in the first set may include removing the "http" or "https" from the social handle URL, and splitting the social handle URL by the question mark "?" if it exists into 2 parts, the left part is split by "/" and right part is split by "&". In general, when there is a redirect symbol such as "#!" or "#" in the social handle URL, the social handle ID can be found after the redirect symbol. Further, the social handle ID in the social handle URL is case-insensitive, and therefore can be set in lower-case.

The normalization rules in the second set are grouped into a subset for a first social network provider (e.g., Facebook), a subset for a second social network provider (e.g., LinkedIn), a subset for a third social network provider (e.g., Twitter), and a subset for a fourth social network provider (e.g., Google+). The number of subset may increase if there are more social network providers to provide their social handles.

Following are the normalization rules for the social network Facebook. For Facebook, the normalization rules are classified into four types - Plain, Profile, People and Pages. Following are for the normalization rules for the Plain type of Facebook. For the Plain type, the social handle ID is located after the domain name and the slash "/" symbol. For example, if the social handle URL is "http://www.facebook.com/1234567", then the social handle ID is "1234567". If the social handle URL includes a redirect sign such as "#!", then the social handle ID is after the redirect sign and after the slash. For example, if the social handle URL is "http://www.facebook.com/#!/Siddo4ty4", then the social handle ID is "Siddo4ty4". The social handle ID for the Plain type of Facebook can be numeric or alphanumeric. Following are some examples of normalizing the social handle URL for the Plain type of Facebook:

| Social Handle URL | Normalized Social Handle |
|---|---|
| http://www.facebook.com/keithwhite | http://www.facebook.com/keithwhite |
| http://www.facebook.com/#!/Siddo4ty4 | http://www.facebook.com/Siddo4ty4 |

Following are for the normalization rules for the Profile type of Facebook. For the Profile type, the social handle URL for the Profile type has a keyword "profile.php?" as part of the URL, and the social handle ID is represented as key value pair and is numeric. Following are some examples of normalizing the social handle URL for the Profile type of Facebook:

| Social Handle URL | Normalized Social Handle |
|---|---|
| http://www.facebook.com/profile.php?id=1247133407 | http://www.facebook.com/1247133407 |
| http://www.facebook.com/search.php?q=Serge Doubinski&type=users#!/profile.php?id=26208305 | http://facebook.com/26208305 |

Following are for the normalization rules for the People type of Facebook. For the People type, the social handle URL has the keyword "people" as part of the URL, and the social handle ID is numeric. Following are some examples of normalizing the social handle URL for the People type of Facebook:

| Social Handle URL | Normalized Social Handle |
|---|---|
| http://www.facebook.com/people/Kate-Lee/100001117817060 | http://www.facebook.com/100001117817060 |

Following are for the normalization rules for the Page type of Facebook. For the Page type, the social handle URL has the keyword "pages" as part of the URL, and the social handle ID is numeric. Following are some examples of normalizing the social handle URL for the Page type of Facebook:

| Social Handle URL | Normalized Social Handle |
|---|---|
| http://facebook.com/pages/Wilmington-NC/NeoNexus-Corporation/81283078247?ref=ts | http://facebook.com/81283078247 |
| http://facebook.com/pages/insideup/168824503128720 | http://facebook.com/168824503128720 |
| http://facebook.com/profile.php?id=100002453742790#/pages/arrowhead-general-insurance-agency-inc/206925925993353 | http://facebook.com/206925925993353 |

Following are the normalization rules for the social network LinkedIn. For LinkedIn, the social handle URL usually include four keywords such as "in", "pub", "company", and "companies". The other information included in the social handle URL for LinkedIn is not used for the normalization. Following are some examples of normalizing the social handle URL for LinkedIn:

| Social Handle URL | Normalized Social Handle |
|---|---|
| http://linkedin.com/in/domenicfenoglio | http://linkedin.com/in/domenicfenoglio |
| http://www.linkedin.com/pub/jeff-schindler/1b/7b0/178/ | http://www.linkedin.com/pub/jeff-schindler/1b/7b0/178 |
| http://linkedin.com/company/simons-bitzer-&-associates?trk=ppro_cprof | http://linkedin.com/company/simons-bitzer-&-associates |
| http://linkedin.com/companies/8291 | http://linkedin.com/companies/8291 |

Following are the normalization rules for the social network LinkedIn with international domains. For the international domain, the country codes are used as subdomains for the domain LinkedIn.com (e.g., uk.linkedin.com). The subdomain indicates a country, and potentially can be used by LinkedIn for load-balancing geographically. The remaining portion of the social handle URL for international domain remains the same whether the social handle URL is used with only the domain or with the subdomain. Thus, when the subdomain is changed to reflect a different country for the same person, the social information remains the same. Locale or language specific pages may be created by adding the local code to the end of the domain. For example, a French profile page may be added to a social handle URL by adding "/fr" at the end of the social handle URL. This enables having a profile in a default language and similar profiles in various languages. For normalization, the country code can be removed from the beginning of the social handle URL. For example, if the social handle URL is uk.linkedin.com, then it can be normalized to www.linkedin.com. When the social handle URL includes a locale identifier at the end, then each locale may be treated as a different social handle since the social information may be different. Following are some examples of normalizing the social handle URL for LinkedIn with international domain:

| Social Handle URL | Normalized Social Handle |
|---|---|
| http://uk.linkedin.com/in/domenicfenoglio | http://linkedin.com/in/domenicfenoglio |
| http://uk.linkedin.com/pub/jeff-schindler/fr | http://www.linkedin.com/pub/jeff-schindler/fr |

Following are the normalization rules for the social network Twitter. For Twitter, the social handle URL usually include the symbol "@" at the beginning of the social handle ID. The symbol "@" can be removed. The social handle URL can include redirect symbol such as "#!", and the social handle ID can be alpha-numeric. Following are some examples of normalizing the social handle URL for LinkedIn:

| Social Handle URL | Normalized Social Handle |
|---|---|
| http%3A%2F%2Fwww.twitter.com%2Fegebhardt | http://twitter.com/egebhardt |
| http://twitter.com/#!/sharito241 | http://twitter.com/sharito241 |
| twitter.com/WindstreamBiz?cm_sp=Res2Biz-_-SelectorFooter-_-Twitter may be redirected to: http://twitter.com/#!/WindstreamBiz | http://twitter.com/WindstreamBiz |

Following are the normalization rules for the social network provider Google+. For Google+, the social handle ID attribute is numeric and the social handle URL may include redirect symbols. Following are some examples of normalizing the social handle URL for Google+:

| Social Handle URL | Normalized Social Handle |
|---|---|
| https://plus.google.com/104891977700776502289 | https://plus.google.com/104891977700776502289 |

Figure 6:
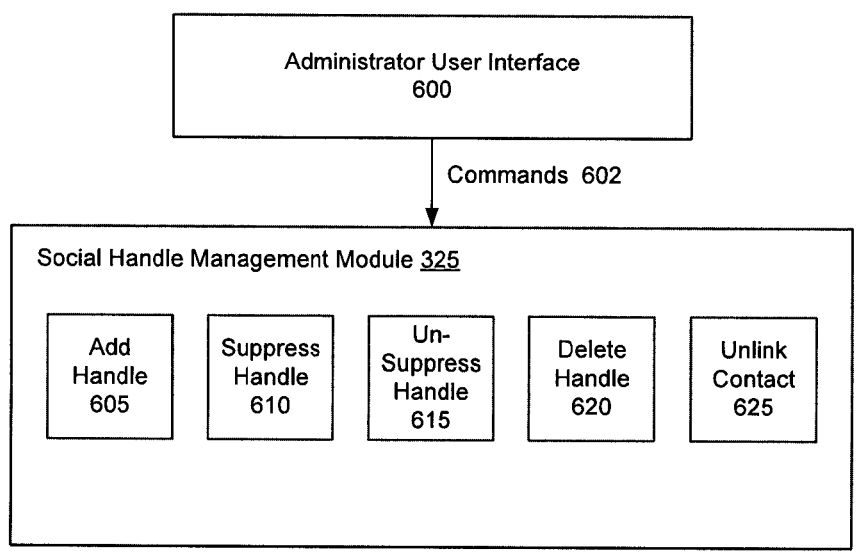
FIG. 6 shows block diagram of a social handle management module, performed in accordance with some embodiments.

FIG. 6 shows block diagram of a social handle management module, performed in accordance with some embodiments. The social handle management module 325 may be coupled to the social handle database 258 and an administrator user interface 600. An administrator may use the administrator user interface 600 to issue commands 602 to cause the social handle management module 325 to add a social handle, suppress a social handle, un-suppress a social handle, delete a social handle, and unlink a contact. A known social handle may be added to the social handle database using the add-social handle module 605. This may be performed using the contribute API discussed above. For privacy purposes, a social handle in the social handle database 258 may be suppressed from being accessed using the suppress module 610. When a social handle is suppressed, it may not be included in the matching API when a response is sent to the requester. When privacy is not an issue, a suppressed social handle may be un-suppressed using the un-suppress module 615. A social handle may also be deleted from the social handle database 258 using the delete module 620. This may be necessary, for example, when it is determined that the social handle is not valid or does not represent the social information of an intended person or entity. A social handle may also be unlinked from a contact information. This may occur, for example, when it is determined that the social handle is not related to the contact information.

Figure 7A:
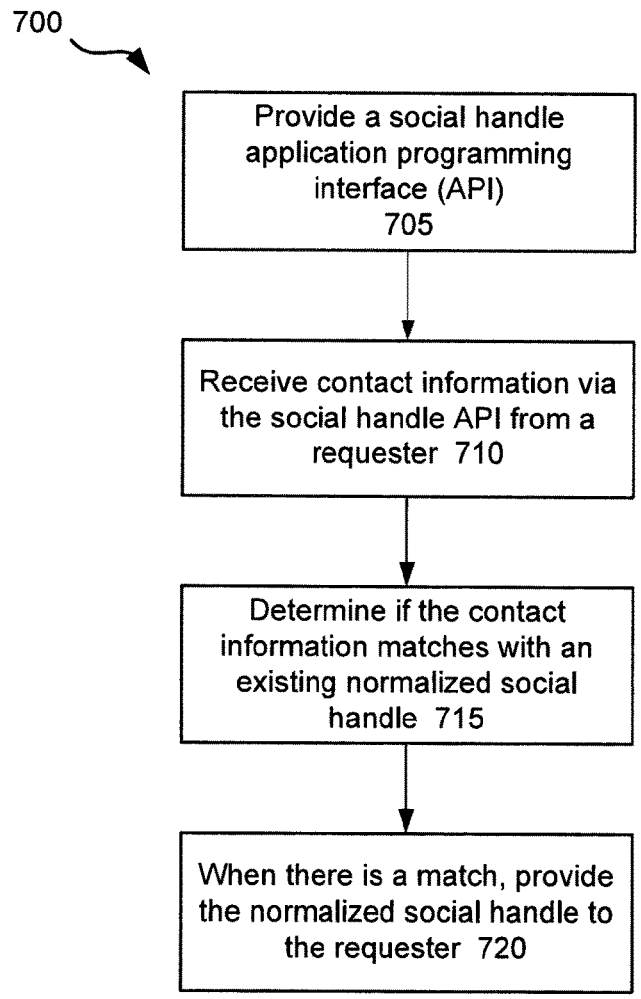
FIG. 7A shows a flowchart of an example process for transmitting a stored normalized social handle to a requester, performed in accordance with some embodiments.

FIG. 7A shows a flowchart of an example process for transmitting a stored normalized social handle to a requester, performed in accordance with some embodiments. The method 700 may be used to enable acquiring social information of a person or an entity. At block 705, the social handle API is made available to enable a requester (e.g., customer, partner, and independent software vendor, or any entity) to request for the social information of a person or an entity. At block 710, the contact information is received from the requester via the social handle API. The contact information may include one or more of first name, last name, email address, telephone number, company name, home address, etc. At block 715, the contact information may be used to determine if there is a match with contact information in the social handle database 258. When there is a match, a stored and normalized social handle corresponding to the contact information may be provided to the requester, as shown in block 720.

Figure 7B:
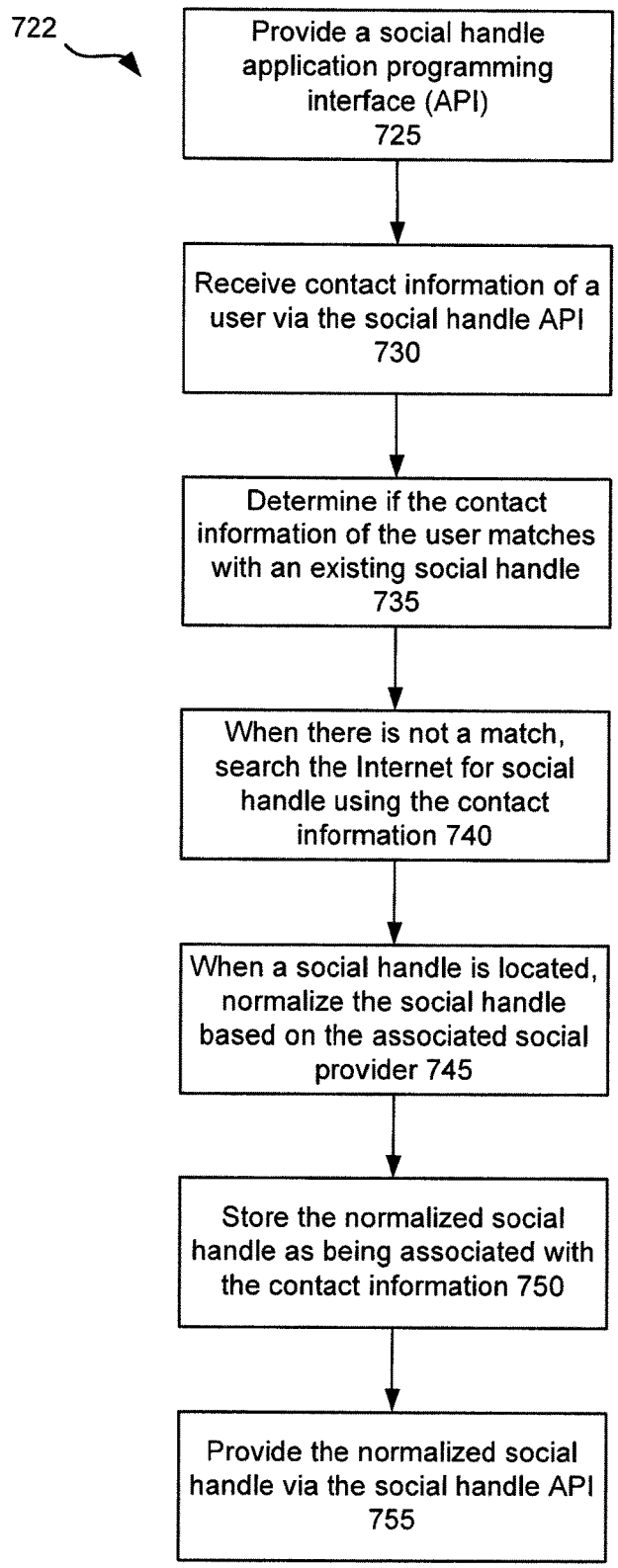
FIG. 7B shows a flowchart of an example process for searching for social handle URL in response to a request for a social handle, performed in accordance with some embodiments.

FIG. 7B shows a flowchart of an example process for searching for social handle URL in response to a request for a social handle, performed in accordance with some embodiments. The method 722 may be used to enable acquiring social information of a person or an entity. At block 725, the social handle API is made available to enable a requester to request for a social handle. At block 730, the contact information is received from the requester via the social handle API. At block 735, the contact information may be used to determine if there is a match with contact information in the social handle database 258. When there isn't a match, a search is performed to find publicly available social handle URL using the contact information, as shown in block 740. One or more social handle URL may be found. At block 745, the social handle URLs found from the search are normalized to generate one or more normalized social handles. At block 750, the one or more normalized social handles are linked with the contact information and stored in the social handle database 258. At block 755, the one or more normalized social handles are sent to the requester.

Figure 8A:
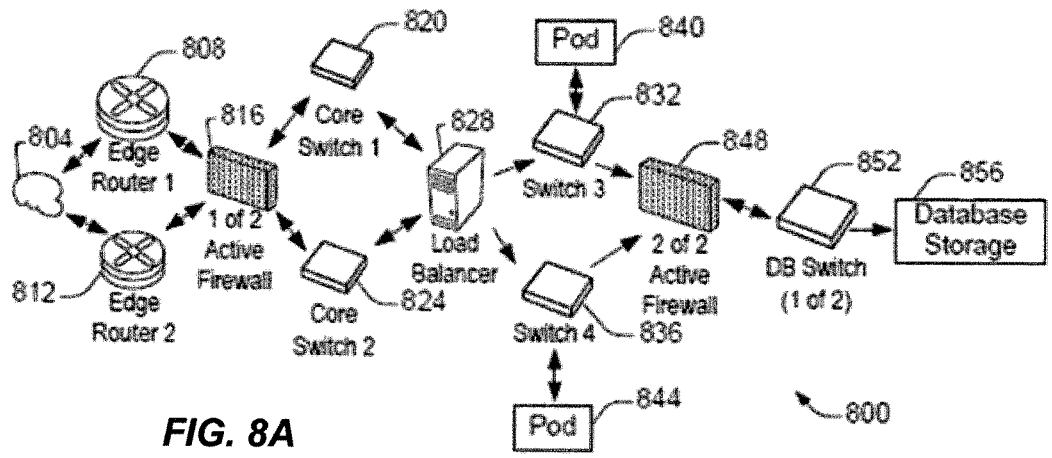
FIG. 8A shows a system diagram 800 illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
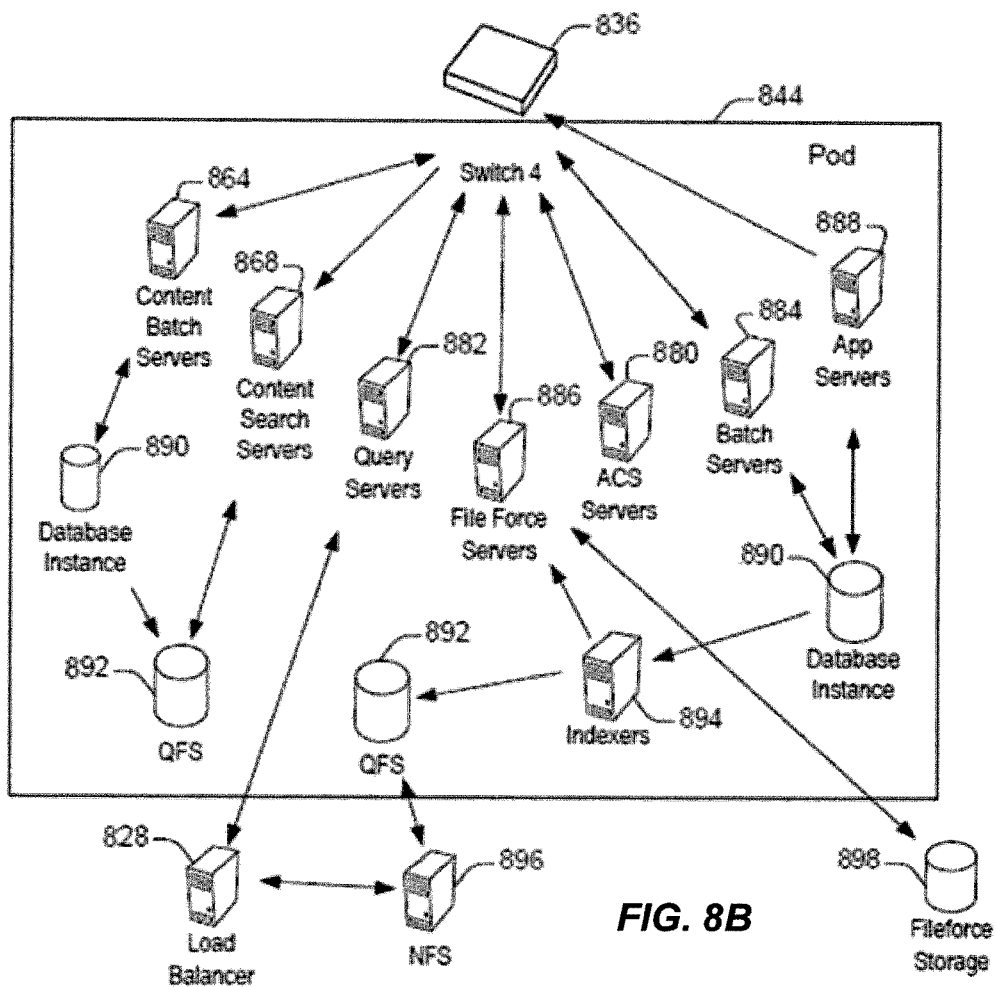
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
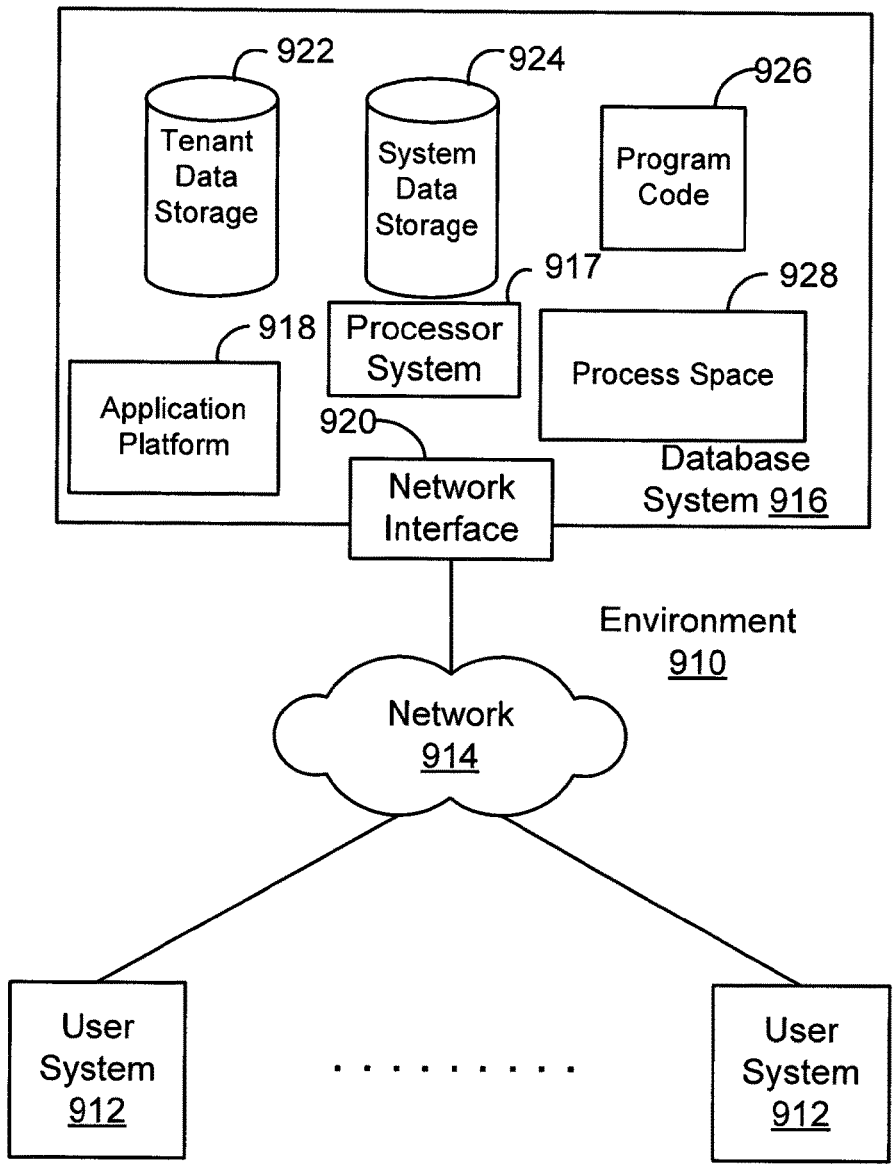
FIG. 9 shows a system diagram 910 illustrating the architecture of a multitenant database environment, in accordance with some embodiments.
Figure 10:
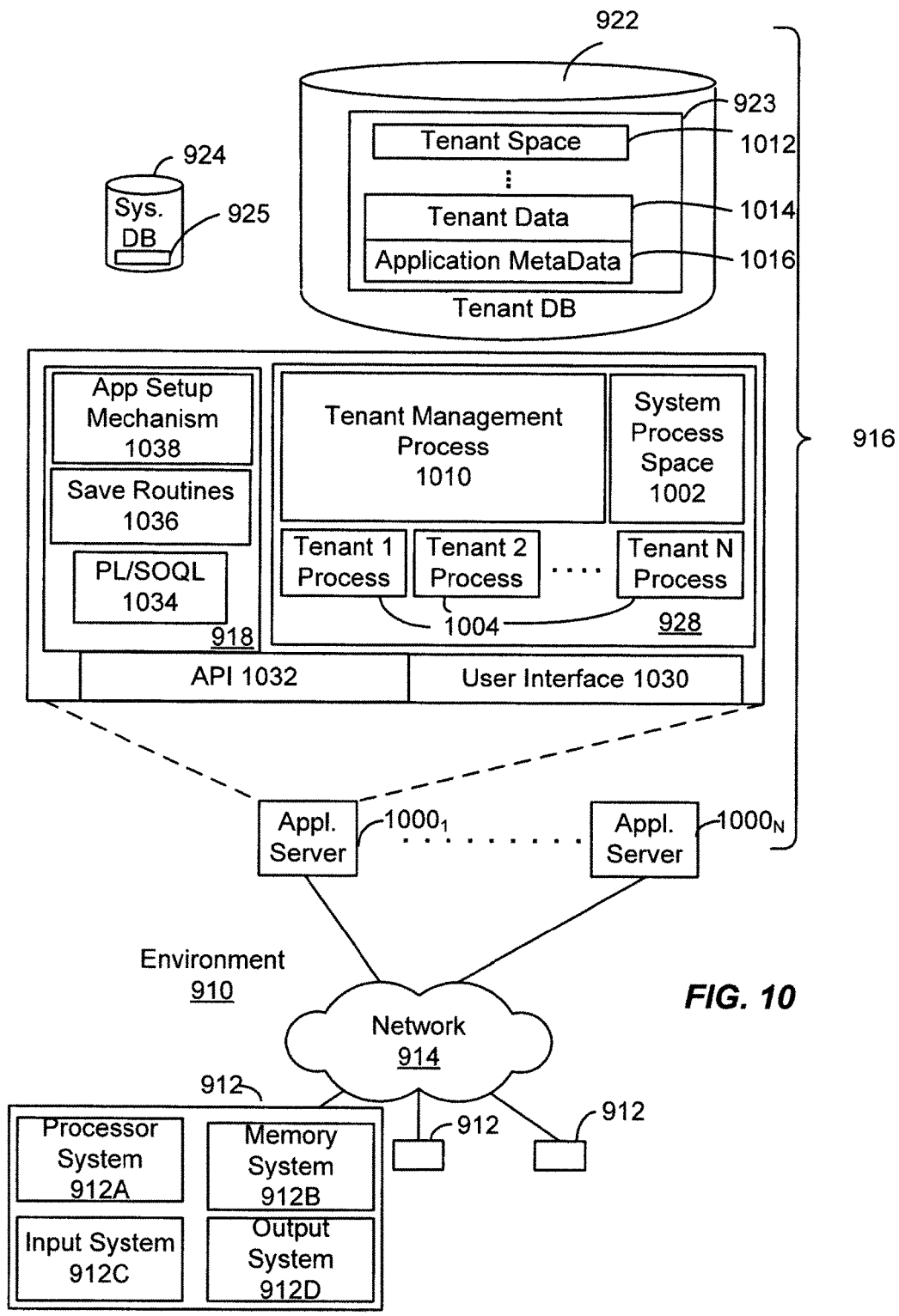
FIG. 10 shows a system diagram 910 further illustrating the architecture of a multitenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VB Script, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations.

Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

The invention claimed is:

1. A computer-implemented method for providing social handles, the method comprising:
   receiving, by a server computing system in an on-demand service environment, a request for normalized social handles, the request including contact information;
   determining, by the server computing system, whether one or more normalized social handles matching the contact information exists in a social handle database, the one or more normalized social handles corresponding to publicly available social handles provided by one or more social networks;
   causing, by the server computing system, upon determining that one or more matching normalized social handles do not exist in the social handle database, a search to be performed using the contact information to identify publicly available social handle uniform resource locators (URLs), each of the publicly available social handle URLs including a protocol identifier, special characters, and a social handle identification (ID) of an entity associated with the contact information embedded within the URL;
   modifying, by the server computing system, the identified public available social handle URLs by removing the special characters embedded in the identified public available social handle URLs and maintaining the protocol identifiers and social handle IDs embedded in the identified public available social handle URLs, each of the modified public available social handle URLs being normalized valid social handle URLs that includes the maintained protocol identifier, at least a portion of the identified public available social handle URL, and the maintained social handle ID; and
   providing, by the server computing system, the normalized social handles.

2. The method of claim 1, further comprising:
   retrieving, upon determining that one or more matching normalized social handles exist on the social handle database, the one or more normalized social handles from the social handle database.

3. The method of claim 2, wherein a normalized social handle associated with a first social network is generated using a first format.

4. The method of claim 3, wherein a normalized social handle associated with a second social network is generated using a second format.

5. The method of claim 4, wherein the one or more normalized social handles are provided in the response based on a confidence level order.

6. The method of claim 4, wherein the one or more normalized social handles are provided in the response based on social network grouping.

7. A system for providing normalized social handles, the system comprising:
   a processor; and
   one or more stored sequences of instructions which, when executed by the processor, cause the processor to:
      receive a request for normalized social handles, the request including contact information and received in an on-demand service environment;
      determine whether one or more normalized social handles matching the contact information exists on a social handle database, the one or more normalized social handles corresponding to publicly available social handles provided by one or more social networks;
      cause, upon determining that one or more matching normalized social handles do not exist in the social handle database, a search to be performed using the contact information to identify publicly available social handle uniform resource locators (URLs), each of the publicly available social handle URLs including a protocol identifier, special characters and a social handle identification (ID) of an entity associated with the contact information;
      modify the identified public available social handle URLs by removing the special characters embedded in the identified public available social handle URLs and maintaining the protocol identifiers and social handle IDs embedded in the identified public available social handle URLs, each of the modified public available social handle URLs being normalized valid social handle URLs that includes the maintained protocol identifier, at least a portion of the identified public available social handle URL, and the maintained social handle ID; and provide the generated normalized social handles.

8. The system of claim 7, wherein the processor is further configured to:

retrieve, upon determining that one or more matching normalized social handles exist on the social handle database, the one or more normalized social handles from the social handle database.

9. The system of claim 8, wherein a normalized social handle associated with a first social network is generated using a first format.

10. The system of claim 9, wherein a normalized social handle associated with a second social network is generated using a second format.

11. The system of claim 10, wherein the one or more normalized social handles are provided in the response based on a confidence level order.

12. The system of claim 10, wherein the one or more normalized social handles are provided in the response based on social network grouping.

13. A computer program product, comprising a non-transitory computer-readable medium having a computer-readable program code embodied therein to be executed by one or more processors, the program code comprising instructions to:

receive a request for normalized social handles, the request including contact information and received in an on-demand service environment;

determine whether one or more normalized social handles matching the contact information exists on a social handle database, the one or more normalized social handles corresponding to publicly available social handles provided by one or more social networks;

cause, upon determining that one or more matching normalized social handles do not exist in the social handle database, a search to be performed using the contact information to identify publicly available social handle uniform resource locators (URLs), each of the publicly available social handle URLs including a protocol identifier, special characters and a social handle identification (ID) of an entity associated with the contact information;

modify the identified public available social handle URLs by removing the special characters from each of the identified public available social handle URLs, each of the modified public available social handle URLs being normalized valid social handle URLs that include a protocol identifier and a social handle ID maintained from the identified public available social handle URL, and at least a portion of the identified public available social handle URL; and provide the generated normalized social handles.

14. The computer program product of claim 13, wherein the program code further comprising instructions to:

retrieve, upon determining that one or more matching normalized social handles exist on the social handle database, the one or more normalized social handles from the social handle database.

15. The computer program product of claim 14, wherein a normalized social handle associated with a first social network is generated using a first format.

16. The computer program product of claim 15, wherein a normalized social handle associated with a second social network is generated using a second format.

17. The computer program product of claim 16, wherein the one or more normalized social handles are provided in the response based on at least one of a confidence level order and a social network grouping.

* * * * *